(12) United States Patent
Henderson et al.

(10) Patent No.: US 6,886,881 B1
(45) Date of Patent: May 3, 2005

(54) DOOR ASSEMBLY FOR A SPORT UTILITY OR SIMILAR VEHICLE

(75) Inventors: Jack V Henderson, Rochester Hills, MI (US); Gregory A Brower, Fenton, MI (US)

(73) Assignee: Bestop, Inc., Broomfield, CO (US)

( * ) Notice: Subject to any disclaimer, the term of this patent is extended or adjusted under 35 U.S.C. 154(b) by 25 days.

(21) Appl. No.: 10/828,615

(22) Filed: Apr. 21, 2004

(51) Int. Cl.⁷ .................................................. B60J 1/08
(52) U.S. Cl. ................ 296/146.2; 296/201; 296/146.5; 49/502
(58) Field of Search .......................... 296/146.2, 146.3, 296/147, 148, 201, 146.1, 146.5; 49/502

(56) References Cited

U.S. PATENT DOCUMENTS

| | | | |
|---|---|---|---|
| 2,567,153 A | * | 9/1951 | Jackson et al. ............... 49/166 |
| 4,644,699 A | * | 2/1987 | Chandler et al. ............. 49/502 |
| 4,716,682 A | | 1/1988 | De Rees |
| 5,465,531 A | * | 11/1995 | Herrmeyer ..................... 49/463 |
| 5,617,675 A | * | 4/1997 | Kobrehel ....................... 49/502 |
| 5,829,195 A | * | 11/1998 | Ojanen ..................... 296/146.2 |
| 5,857,731 A | * | 1/1999 | Heim et al. .............. 296/146.2 |
| 5,867,942 A | * | 2/1999 | Kowalski ....................... 49/502 |
| 6,036,255 A | | 3/2000 | Lester et al. |
| 6,036,256 A | | 3/2000 | Hilliard et al. |

* cited by examiner

Primary Examiner—Patricia L. Engle
(74) Attorney, Agent, or Firm—W. Scott Carson

(57) ABSTRACT

A door assembly with upper and lower door portions. The upper door portion has a window section with one or more clear panels mounted in a frame member. In use, the entire upper door portion including the frame member and window section can be removed as a unit and conveniently stored in a pocket or cavity in the lower door portion. The window section in one embodiment has a vertically retractable panel and in another, two clear panels are provided that can be slid horizontally to open the window area. Another embodiment has a folding or pivoting upper door portion which can be collapsed on itself and conveniently stored in the cavity or pocket of the lower door portion.

32 Claims, 13 Drawing Sheets

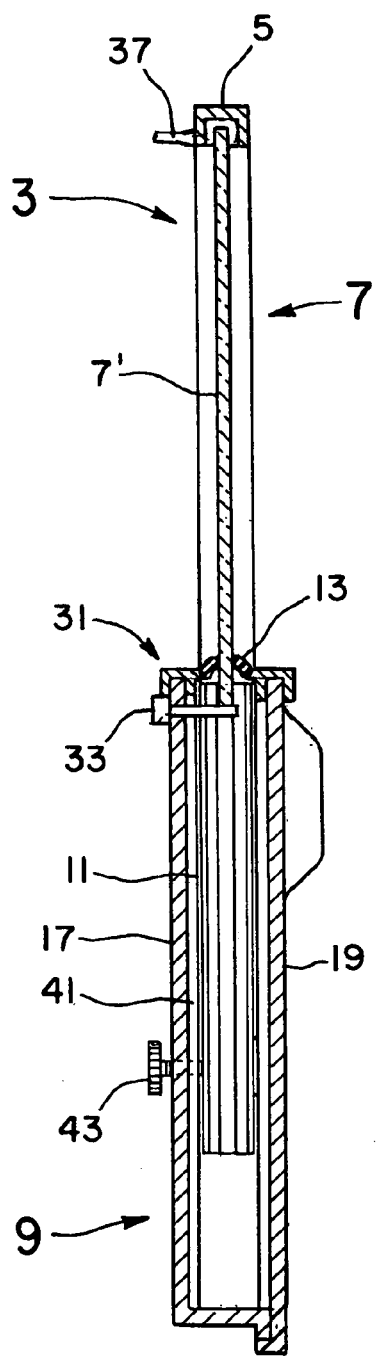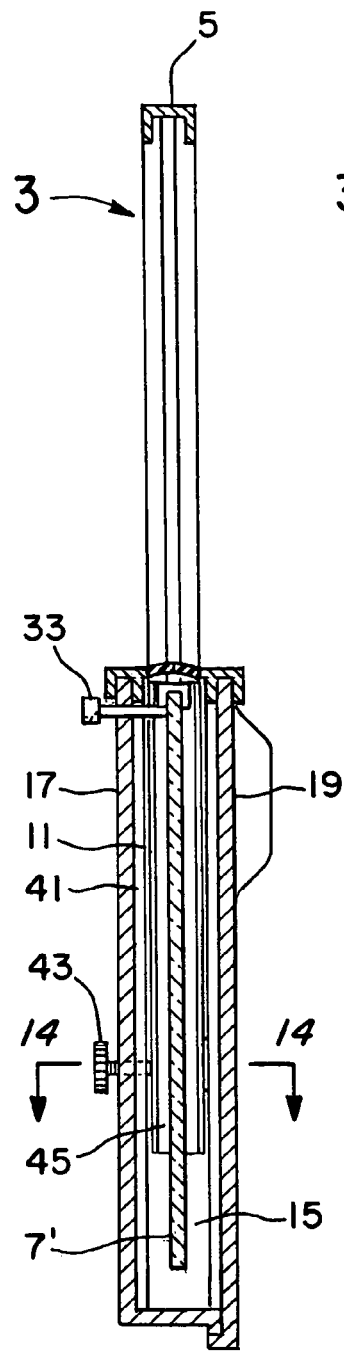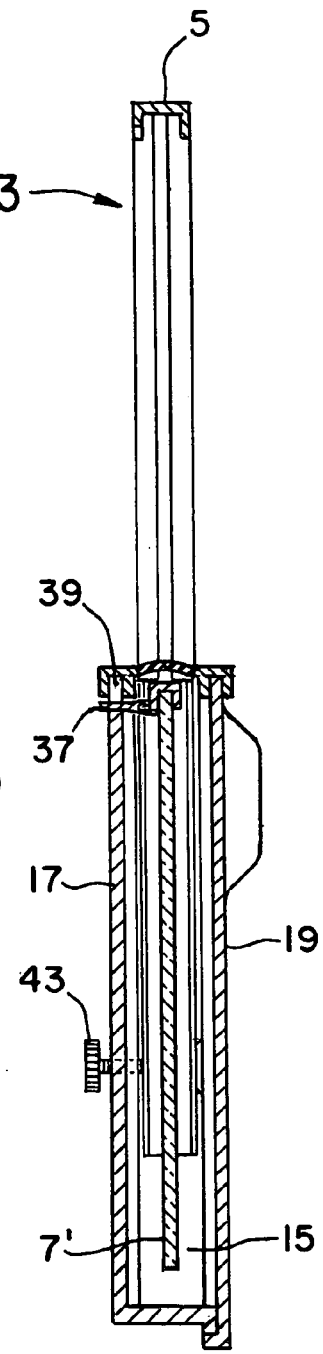
*Fig. 9*     *Fig. 10*     *Fig. 11*

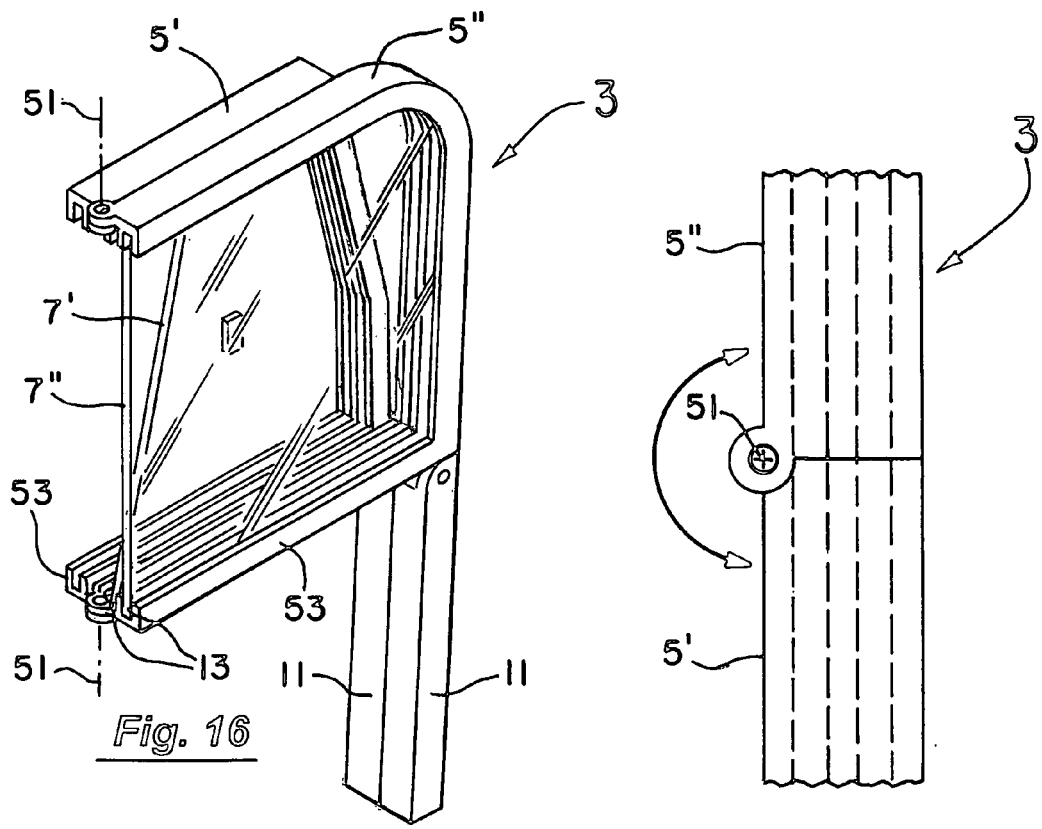
Fig. 16
Fig. 17
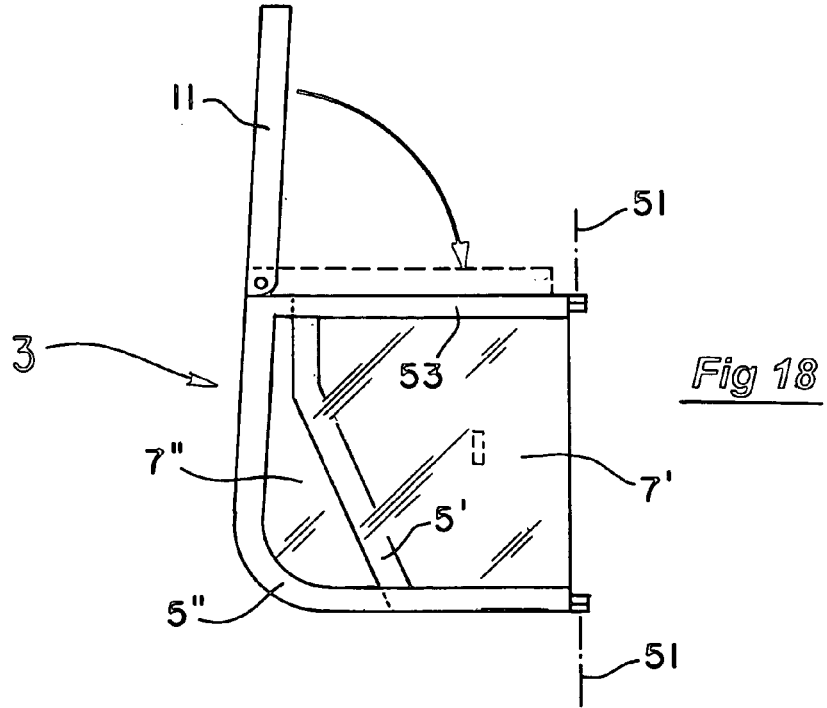
Fig 18

US 6,886,881 B1

DOOR ASSEMBLY FOR A SPORT UTILITY OR SIMILAR VEHICLE

BACKGROUND OF THE INVENTION

1. Field of the Invention

This invention relates to the field of door assemblies for sport utility and similar vehicles and more particularly to the field of such assemblies with removable, upper window sections.

2. Discussion of the Background

Sport utility and similar vehicles are very popular. One reason for this is their versatility in that they normally can be easily and quickly modified for different uses and situations. As for example, many such vehicles have parts such as window panels and tops that can be lowered or removed for an open air experience. Additionally, a wide variety of interior and exterior accessories such as consoles and roof racks are also commonly available for them.

Door assemblies in such vehicles come in a wide range of choices. Some of the more popular ones have removable, upper window sections. In use, the window section can be secured in place to the lower door portion to enclose the interior of the vehicle and then completely removed from the lower door portion for an open air experience. Once removed, a problem arises with current designs as to how and where to store the window section. Space is normally at a premium in sport utility vehicles so storing the removed window section, for example, in the rear deck area of the vehicle can undesirably use up valuable space. Similarly, storing the removed window section on the exterior of the vehicle not only can use up carrying space but also can unduly expose the window section to potential damage from weather and flying debris such as stones. Storing the removed window section at home or otherwise remotely from the vehicle has the obvious disadvantage of not being able to enclose the vehicle if the weather or other conditions should change.

With this and other problems in mind, the present invention was developed. In it, a door assembly is presented that has a removable, upper window section that is storable in a neat and out of the way manner in the lower door portion when not in use.

SUMMARY OF THE INVENTION

This invention involves a door assembly with upper and lower door portions. The upper door portion has a window section with one or more clear panels mounted in a frame member. In use, the entire upper door portion including the frame member and window section can be removed as a unit and conveniently stored in a pocket or cavity in the lower door portion. In the stored position, a cover can be provided over the lower door portion. The cover encloses the lower door portion to keep dust, dirt, and other elements out of the storage cavity and away for the upper door portion in it. The cover can also conveniently serve as an arm rest for the driver or passengers.

In several embodiments, the window section of the upper door portion can be opened for the convenience of the driver and passengers while still mounted above the lower door portion. The window section in one embodiment has a vertically retractable panel and in another, two clear panels are provided that can be slid horizontally to open the window area. A folding or pivoting embodiment of the upper door portion is also disclosed which can be collapsed on itself and conveniently stored in the cavity or pocket of the lower door portion.

BRIEF DESCRIPTION OF THE DRAWINGS

FIG. 9 is a view taken along line 9—9 of FIG. 8 showing the retractable window panel in its up position.

FIG. 10 is a view similar to FIG. 9 but with the retractable window panel in its down position.

FIG. 11 is a view taken generally along line 11—11 of FIG. 8 with the window panel shown retracted and its attached handle abutting the lower door portion.

FIG. 16 is a perspective view of the embodiment of FIG. 15 illustrating how the window section has a frame member that can be folded or pivoted to collapse on itself.

FIG. 17 is a plan view of the foldable window section of FIGS. 15 and 16.

FIG. 18 illustrates how the collapsed window section of FIG. 16 can be inverted and its supporting leg members pivoted to a flush position.

DETAILED DESCRIPTION OF THE INVENTION

Figure 1:
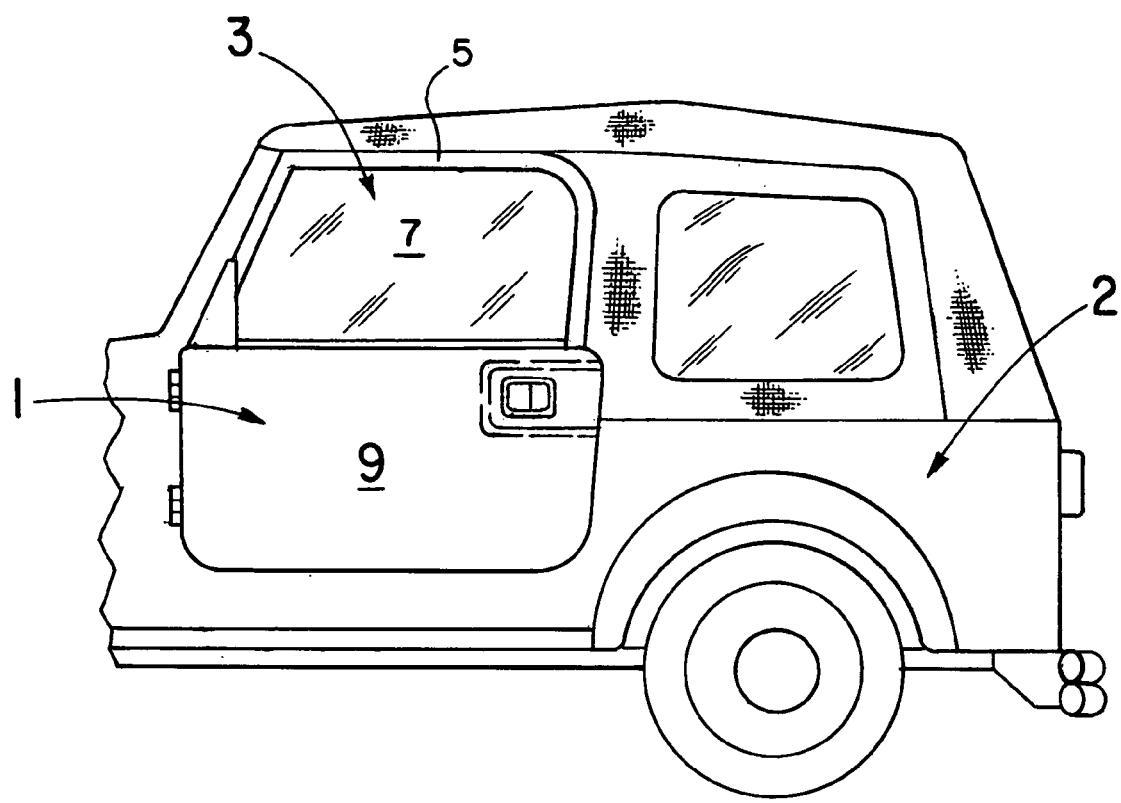
FIG. 1 is a side elevational view of a door assembly according to the present invention in use on a sport utility or similar vehicle.
Figure 2:
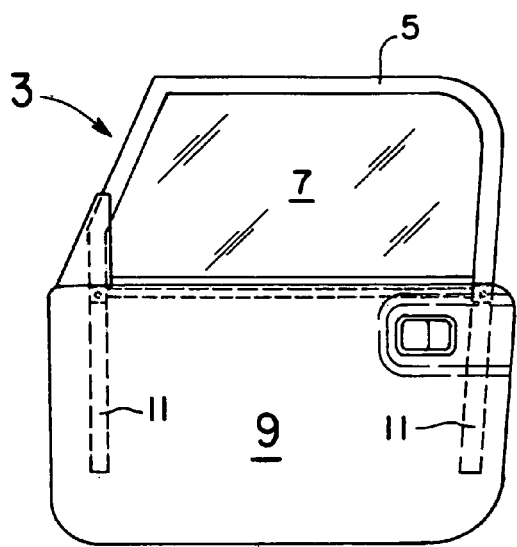
FIG. 2 is a side elevational view of the door assembly of FIG. 1 showing the upper door portion with its window section mounted above the lower door portion.
Figure 3:
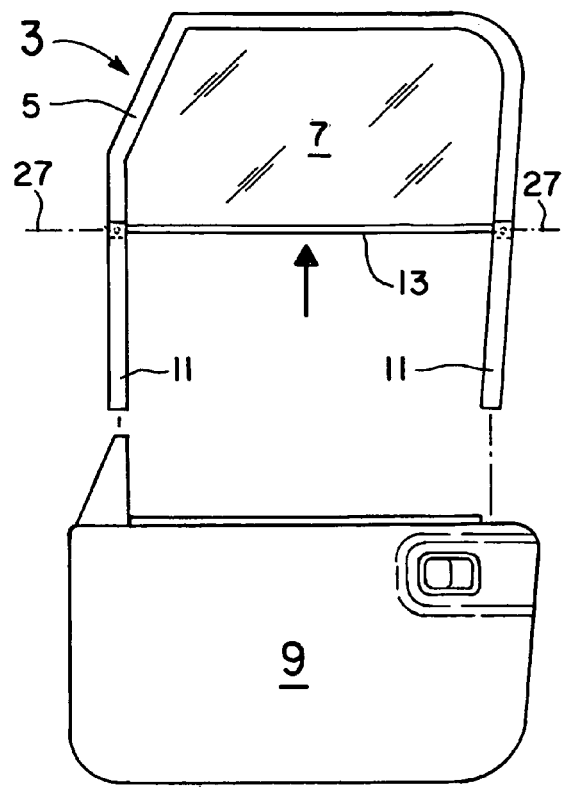
FIG. 3 illustrates the upper door portion of FIG. 2 being removed from the lower door portion.

As shown in FIG. 1, the present invention involves a door assembly 1 for a sport utility or other vehicle 2. The door assembly 1 includes an upper door portion 3 with a frame member 5 and window section 7 and a lower door portion 9. The upper door portion 3 as illustrated in FIGS. 1–3 is removably mounted to the lower door portion 9. In the attached position of FIGS. 1 and 2, the upper door portion 3 is supported on the lower door portion 9 with the frame member 5 and window section 7 extending upwardly above the lower door portion 9. In one mode of operation as schematically depicted in FIGS. 1–5, the upper door portion 3 can first be lifted up and removed from the lower door portion 9 (FIG. 3). Thereafter, the upper door portion 3 can be inverted (FIG. 4) with the leg members 11 pivoted or folded substantially flush with the window or panel edge 13 and the upper door portion 3 then inserted into the lower door portion 9 (FIG. 5) for convenient storage.

Figure 5:
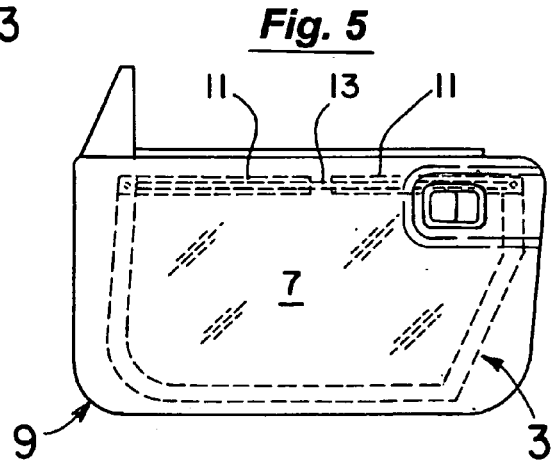
FIG. 5 shows the upper door portion in its stored position in the lower door portion.
Figure 6:
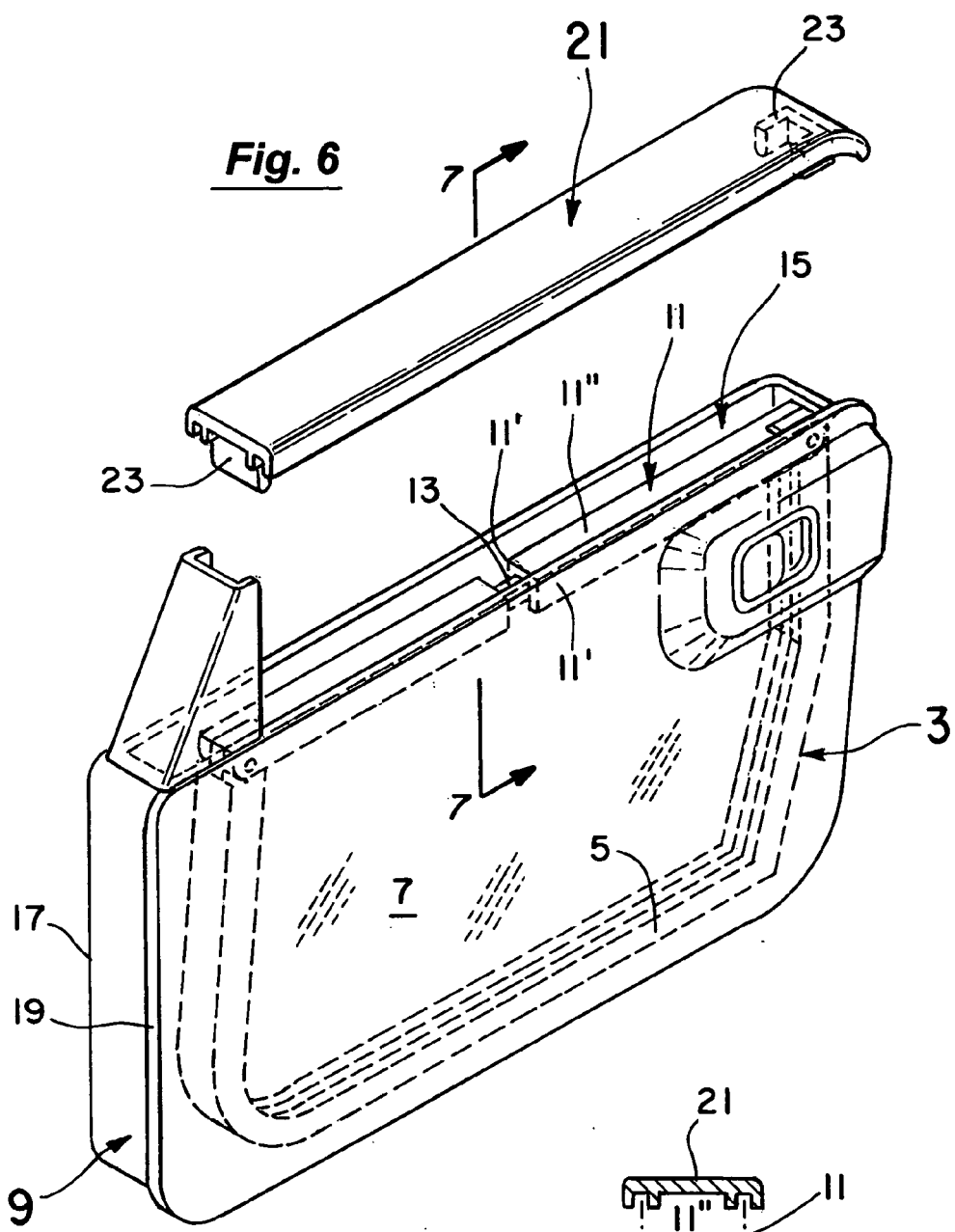
FIG. 6 is a perspective view of the stored, upper door portion of FIG. 5 and the arm rest cover that can be used to enclose the lower door portion and the upper door portion stored in it.

In the stored position as shown in FIGS. 5 and 6, the upper door portion 3 including the frame member 5 and window section 7 are preferably entirely received in the storage cavity or pocket 15 (FIG. 6). This storage cavity 15 as illustrated extends between the inner and outer panel sections 17 and 19 of the lower door portion 9. An elongated cover 21 can then be provided to sealingly engage over the storage cavity 15 to protect the stored upper door portion 3 from dirt, dust, and other elements. The cover 21 is preferably padded or contoured to also serve as an arm rest. Additionally, the cover 21 preferably has detents such as 23 at either end to aid in holding the cover 21 in place. The detents 23 in this regard can also contact or straddle the ends of the stored lower door portion 3 to help keep the upper door portion 3 securely in place in the lower door portion 9.

Figure 4:
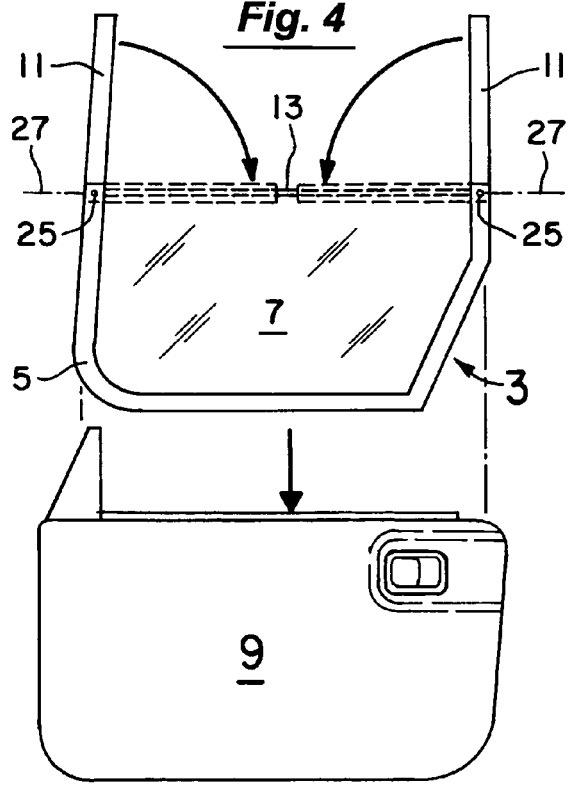
FIG. 4 illustrates how the upper door portion of FIG. 3 can be inverted and the supporting leg members pivoted to be flush with the edge of the window panel.
Figure 7:
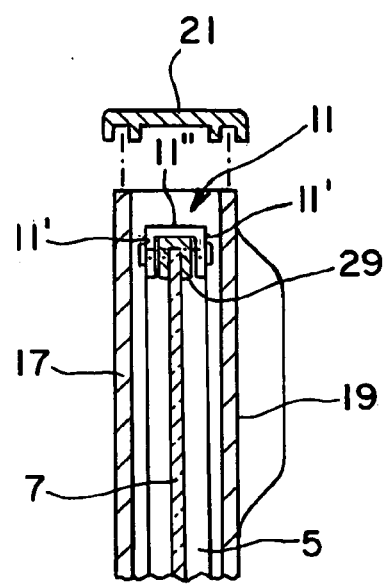
FIG. 7 is a view taken along line 7—7 of FIG. 6.

As shown in FIGS. 6 and 7, each leg member 11 in this first embodiment preferably has a substantially U-shape cross section with two sides 11' spaced from each other and a base 11" extending therebetween. In operation as discussed above, the leg members 11 can be folded about the pivotal axes 25 in FIG. 4 from respective positions extending away from the window edge 13 to the folded positions shown in dotted lines extending substantially along the window edge 13. In the folded positions, the window edge 13 is preferably received in the U-shape of each leg member 11 (see again FIG. 7). The line of the window edge 13 could vary but is shown in FIGS. 3 and 4 extending substantially straight along an axis 27. The leg members 11 are then movable between positions extending substantially perpendicular to the axis 27 (FIG. 4) and folded positions extending substantially parallel to the axis 27. The window edge 13 in this regard may have a plastic or other cover member such as 29 on it as in FIG. 7 if desired.

In manipulating the upper door portion 3 from the first orientation of FIGS. 1 and 2 to the second or inverted orientation of FIGS. 4 and 5, the upper door portion 3 can be moved in any number of manners. Regardless, in the second orientation of FIG. 4, the upper door portion 3 has preferably been inverted about a substantially horizontal axis such as 27 from the position of FIG. 3. The inverted, upper door portion 3 can then be easily and quickly placed in the stored position of FIG. 5 and sealed in place by the cover 21 of FIGS. 6 and 7.

In the embodiment of FIGS. 8–14, the operation of the door assembly 1 is essentially the same as in the embodiment of FIGS. 1–7 except the clear panel 7' of the window section 7 is retractable. In this manner and with the clear panel 7' raised or closed as in FIGS. 8 and 9, the interior of the vehicle 2 is protected from the elements as in FIG. 1. The frame member 5 and window section 7 in this position like the earlier embodiment extend upwardly above the lower door panel 9. However, unlike the earlier embodiment as discussed above, the clear panel 7' of FIG. 8 can be retracted or lowered relative to the frame member 5 for the convenience of the driver or passenger. This is illustrated in FIGS. 10 and 11 in which the retracted panel 7' is shown substantially received in the storage cavity 15 of the lower door portion 9. The clear panel 7' of the window section 7 in this and all the embodiments is preferably made of glass but could be made of plastic or other materials as desired.

Referring again to FIGS. 8 and 9 and with the panel 7' in the up or raised position, a lock mechanism 31 (see also FIG. 12) can be provided to maintain the panel 7' in this position. The illustrated locking mechanism 31 has a simple sliding member or stop 33 that can be moved beneath the glass edge 13 as shown in FIG. 9 to keep the panel 7' locked in the raised position. Similarly, the sliding member 33 can be withdrawn as in FIG. 10 to allow the panel 7' to be retracted or lowered into the storage cavity 15 of the lower door portion 9. In doing so as perhaps best seen in FIG. 12, a clip mechanism 35 can be provided on the top edge 13' of the panel 7'. The clip mechanism 35 has a handle 37 protruding outwardly of the panel 7' and in use, the handle 37 can be manually depressed to lower the panel 7' as desired. In the fully retracted position of FIG. 11, the handle 37 preferably abuts the inner panel section 17 of the lower door portion 9 (see also FIG. 12). This serves to keep the panel 7' from moving beyond the predetermined, fully retracted position of FIGS. 10 and 11. The handle 37 in this regard can be conveniently received in the notch 39 of FIG. 12 in the lower door portion 9. Alternatively and if the frame 5 for example extended across the bottom of the upper door portion 3, the notch 39 as well as the locking mechanism 31 could be in this bottom run of the frame member 5 if desired.

Figure 8:
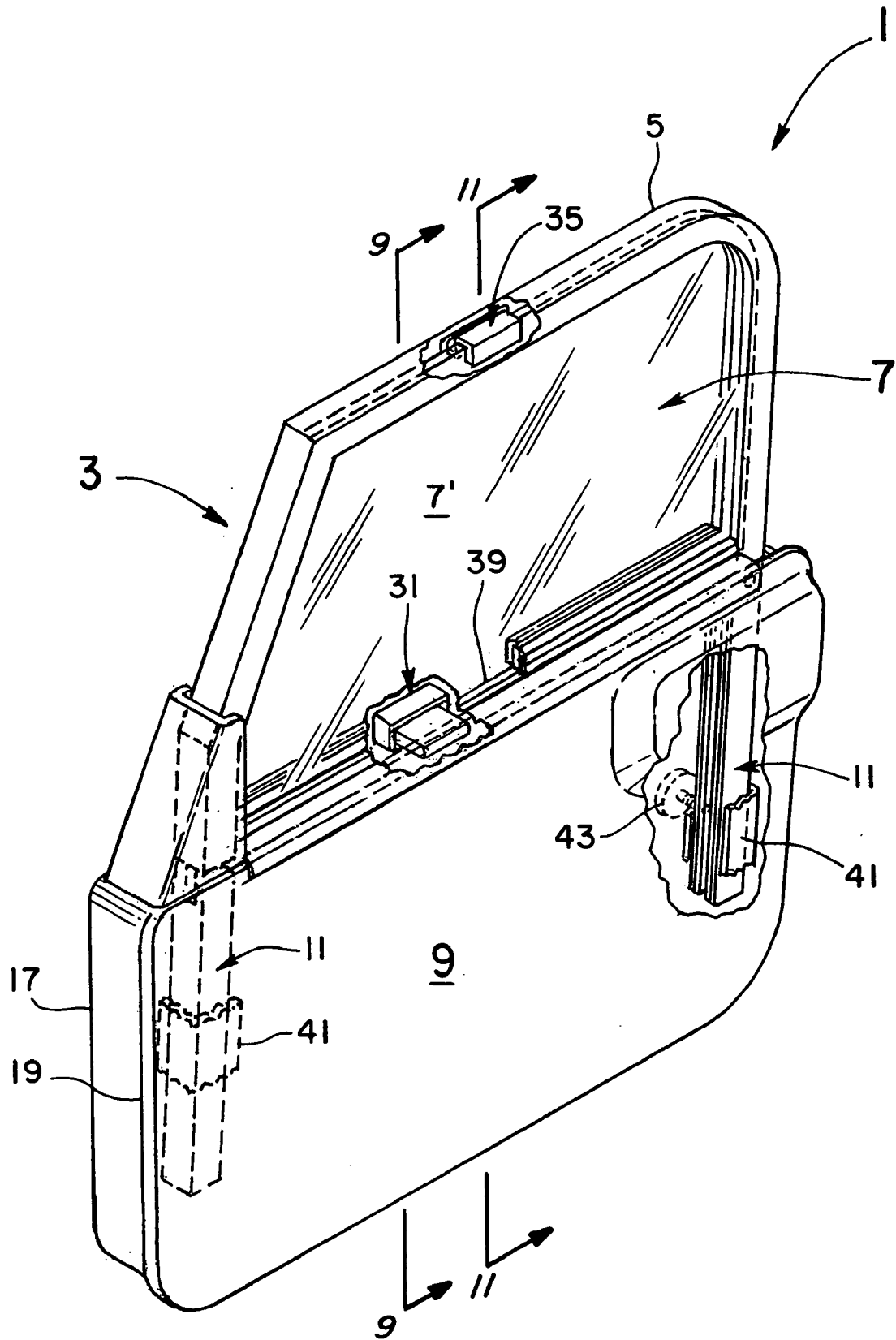
FIG. 8 is a perspective view of another embodiment of the present invention in which the clear panel of the window section is vertically retractable.
Figure 14:
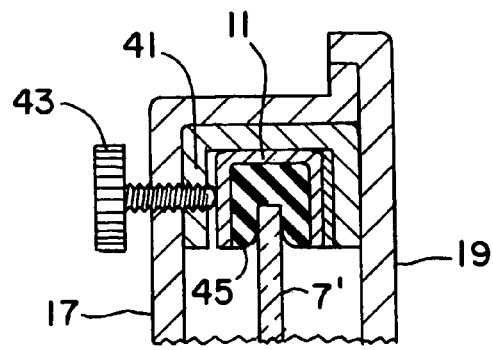
FIG. 14 is a view taken along line 14—14 of FIG. 10.
Figure 12:
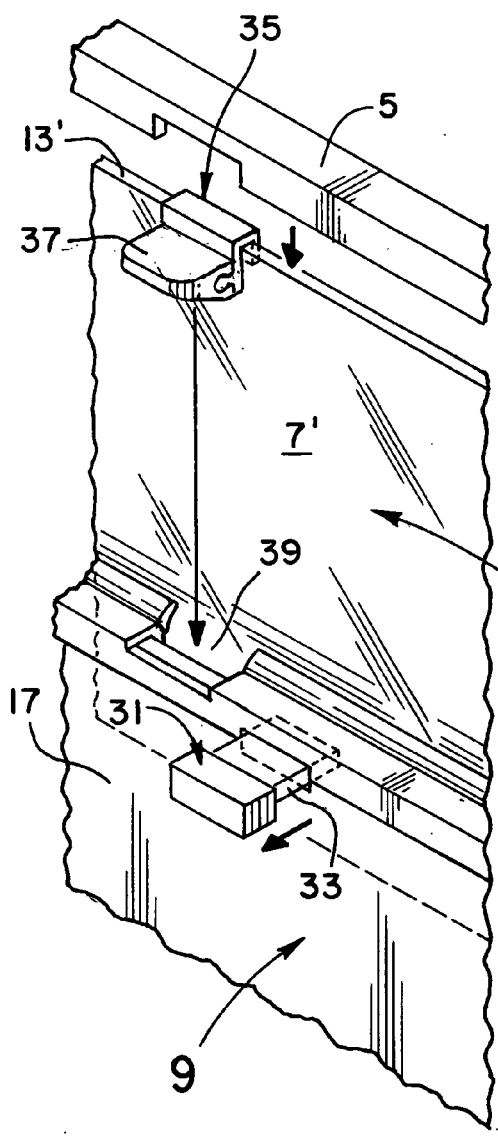
FIG. 12 is a perspective view of the window panel of the embodiment of FIG. 8 in a partially retracted position.
Figure 13:
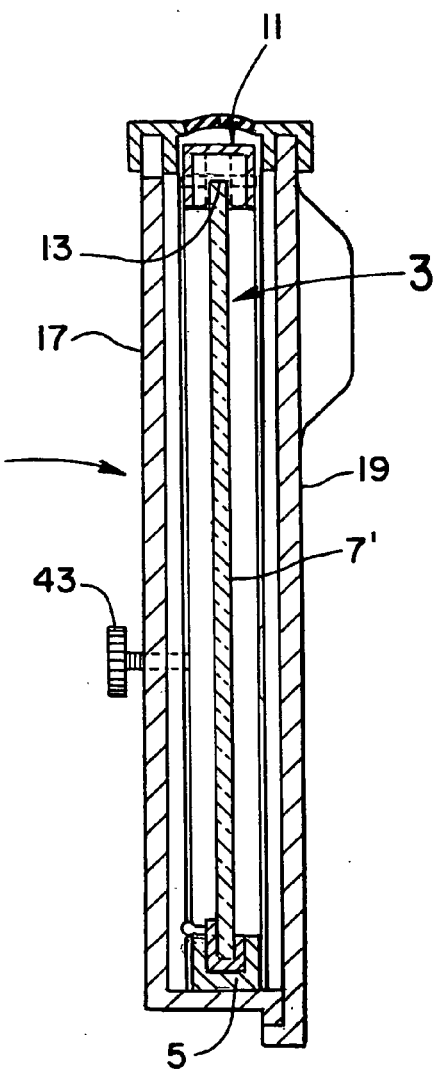
FIG. 13 is a view similar to FIGS. 9–11 but showing the upper door portion including the window section and its frame member removed from atop the lower door portion and stored in it.
Figure 15:
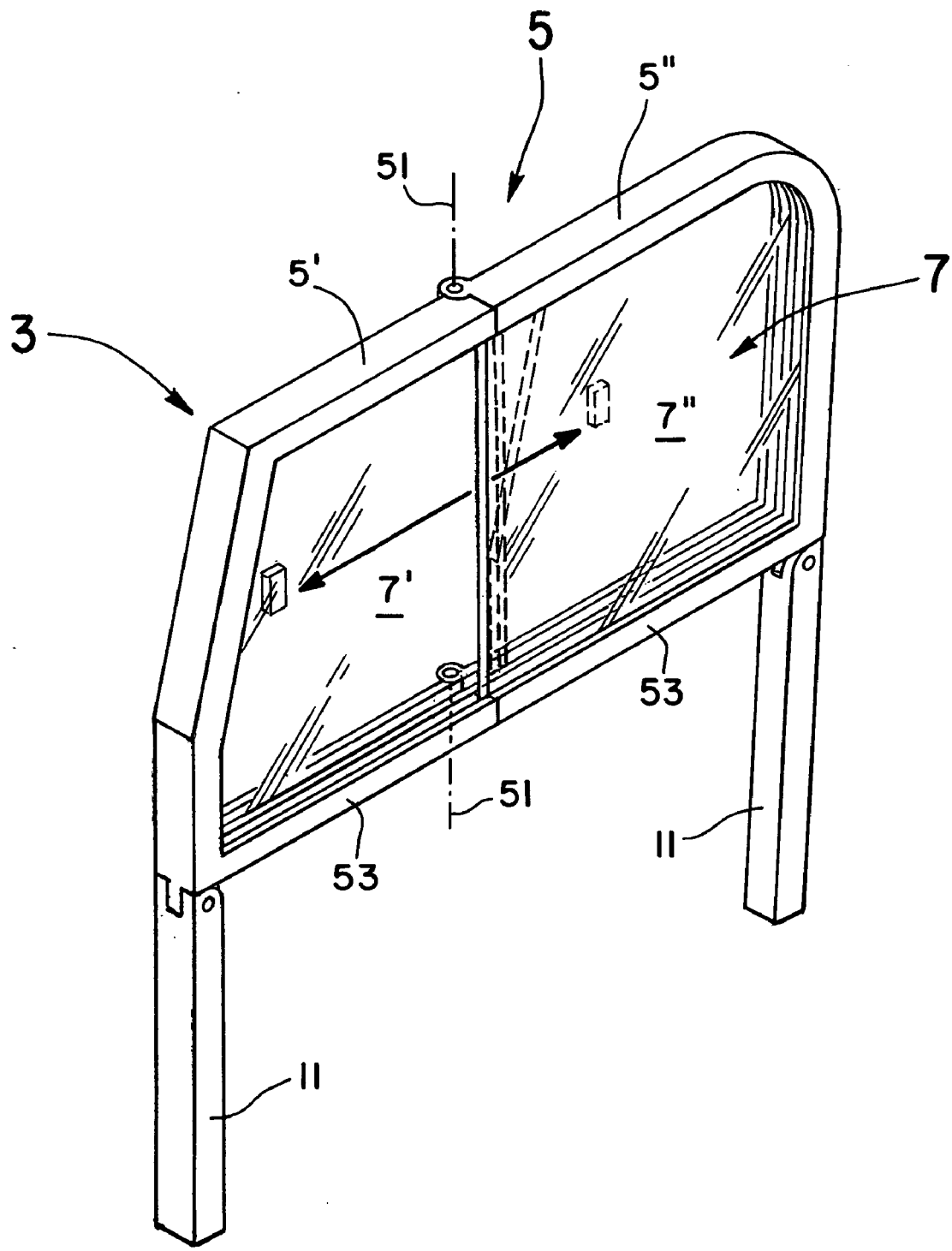
FIG. 15 illustrates a further embodiment of the window section of the present invention in which it includes two clear panels.
Figure 19:
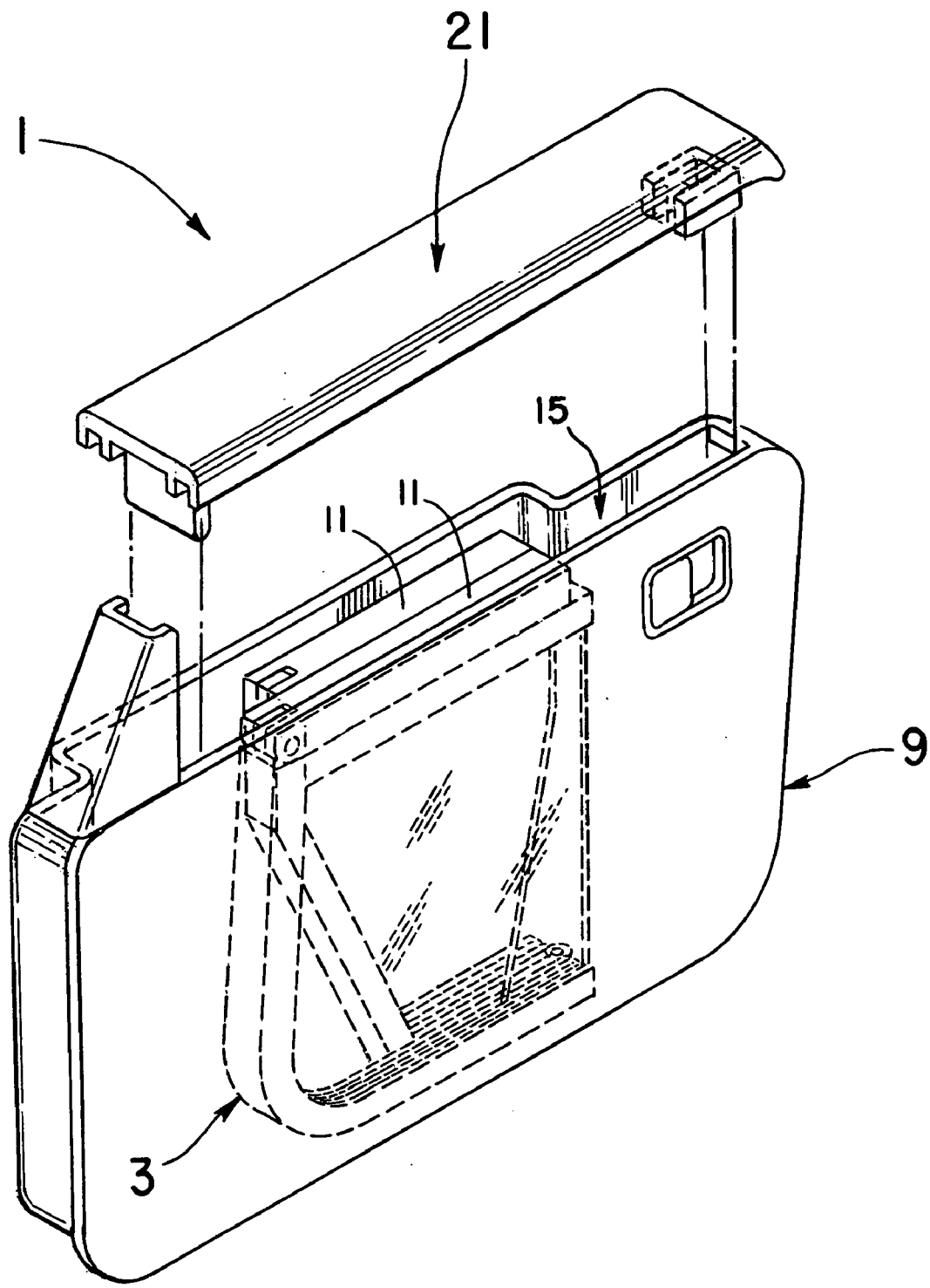
FIG. 19 illustrates the window frame of FIG. 18 in its stored position in the lower door portion and a covering arm rest that can be provided.

Like the embodiment of FIGS. 1–7, the upper door portion 3 of the embodiment of FIG. 8 can be removed from the lower door portion 9 and inverted. Similarly, and with the leg members 11 folded substantially flush along the glass edge 13 (see FIG. 13), the upper door portion 3 can be inserted into the storage cavity 15 of the lower door portion 9. Also, like the embodiment of FIGS. 1–7 and as best seen in FIGS. 8–11, the lower door portion 9 is preferably provided with substantially U-shaped channel members 41. The members 41 are dimensioned to slidably receive the extended leg members 11 and support the upper door portion 3 atop the lower door portion 9. A mechanism such as the screw 43 in FIGS. 8–11 can be provided to selectively secure or lock each leg members 11 in place. As illustrated in FIG. 14, the screw 43 in each channel member 41 can be advanced against the respective leg member 11. A threaded hole could also be provided in the leg member 11 if desired to receive the screw 43. With the retractable panel 7' of this embodiment, each leg member 11 preferably includes a sealing member such as 45 (see FIG. 14) to seal against the retracted panel 7'.

FIGS. 15–19 illustrate an embodiment of the present invention in which the window section 7 has two, horizontally sliding panels 7' and 7". This embodiment also has a frame member 5 completely surrounding the window section 7. The frame member 5 additionally has two segments 5' and 5" that are pivotally mounted to each other. In use and with the upper door portion 3 mounted on the lower door portion 9 as in the earlier embodiments, the panels 7' and 7" of FIG. 15 can be individually slid horizontally as desired. Further and essentially in the manner of the earlier embodiments, the upper door portion 3 can be removed and stored in the cavity 15 (FIG. 19) of the lower door portion 9 and enclosed by the arm rest cover 21.

More specifically and with the upper door portion 3 removed from the lower door portion 9 (FIG. 15) and the front panel 7' slid rearwardly adjacent the rear panel 7", the frame segments 5' and 5" can be pivoted about the axis 51 relative to each other (FIG. 16). In doing so, the segments 5' and 5" are moved from the open position of FIG. 15 extending away from each other to the folded position of FIG. 16 extending substantially along one another. With the leg members 11 folded to extend substantially along the glass edges 13 of the panels 7' and 7" and along the portions 53 of the frame segments 5' and 5", the inverted upper door portion 3 of FIG. 18 can subsequently be inserted and stored in the cavity 15 of the lower door portion 9 (FIG. 19) and capped by the cover 21.

Figure 20:
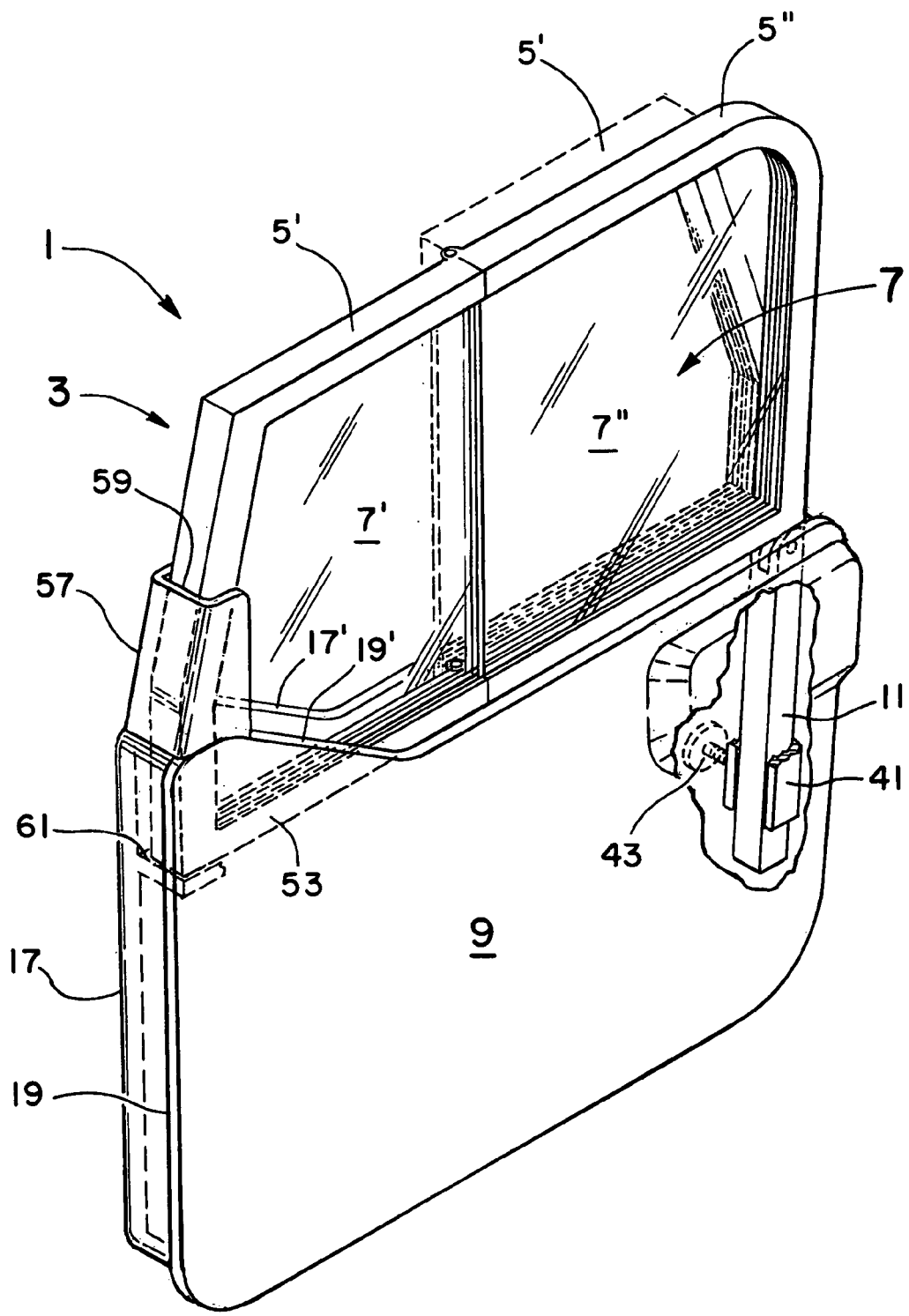
FIG. 20 shows an additional embodiment of the window section which has a single leg member in the rear and is mounted in the front between the inner and outer panels of the lower door portion.
Figure 21:
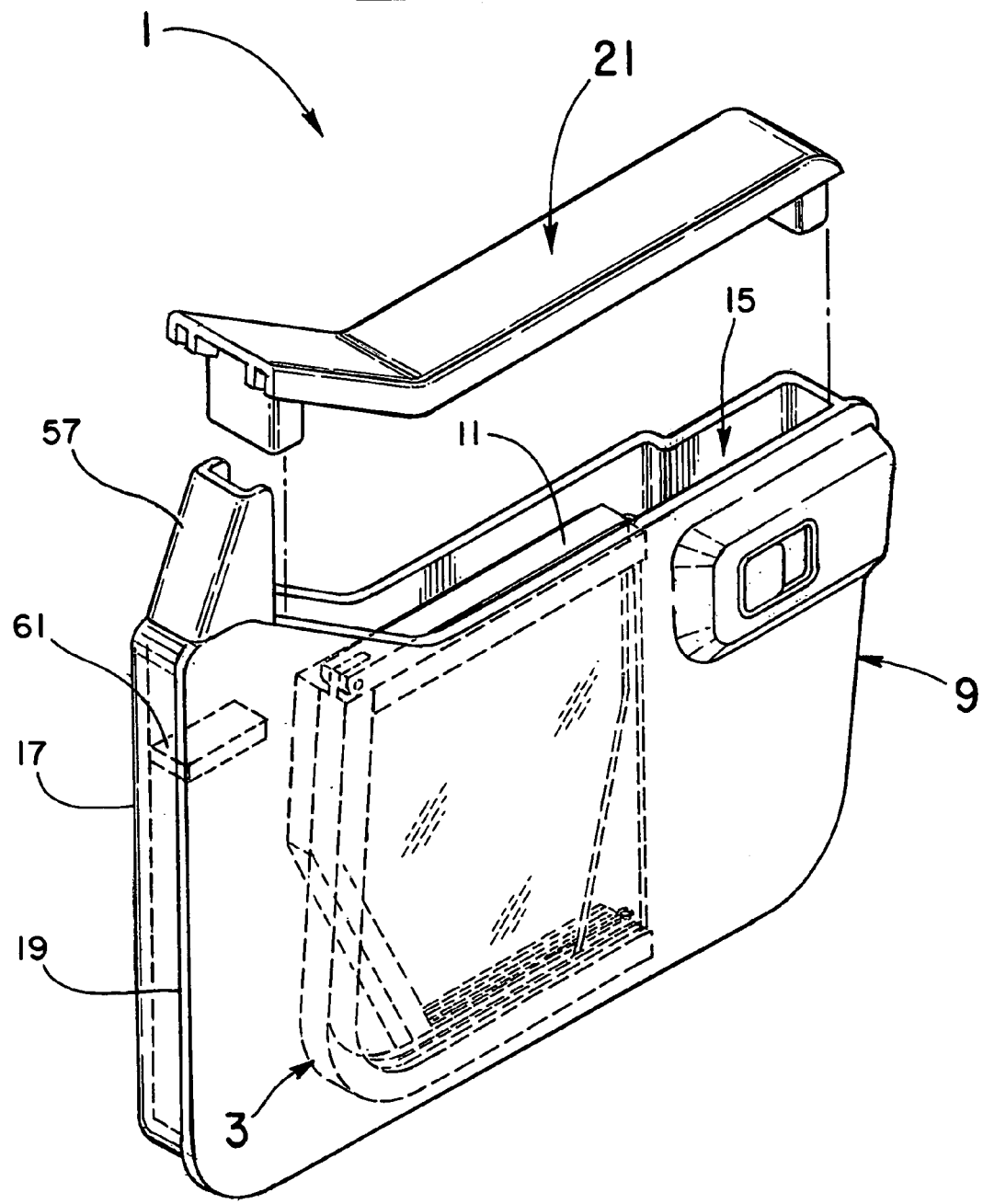
FIG. 21 illustrates the embodiment of FIG. 20 in its stored position.

FIGS. 20 and 21 illustrate an adaptation of the door assembly of FIGS. 15–19 to a common design of a lower door portion 9. In this design, the inner and outer panel sections 17 and 19 of the lower door portion 9 have front pieces 17' and 19' rising up to the upstanding flag member 57. Like the embodiment of FIGS. 15–19, the cavity 15 of the lower door portion 9 is widened to accommodate the folded frame segments 5' and 5". However, because the panel sections 17 and 19 have rising front pieces 17' and 19', the front leg member 11 of the embodiment of FIGS. 15–19 can be deleted if desired. The front frame segment 5' as shown in FIG. 20 would then be received and supported atop the lower door portion 9 between the pieces 17' and 19'. As illustrated in FIG. 20, the front of the frame segment 5' is received in the channel 59 of the flag member 57 with the bottom portion 53 of the frame segment 5' resting on the support member 61 (see also FIG. 21).

Figure 22:
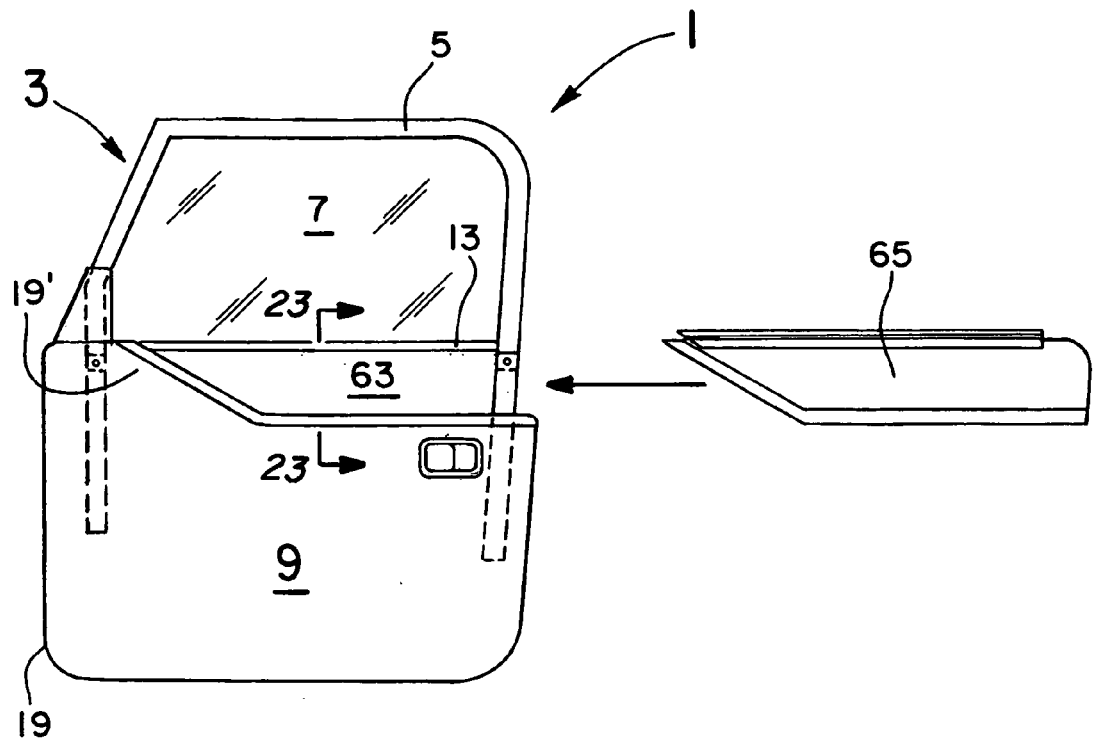
FIG. 22 is another embodiment of the present invention in which the rear of the window section of the upper door portion is spaced from the lower door portion and inserts are provided to fill in the space.
Figure 23:
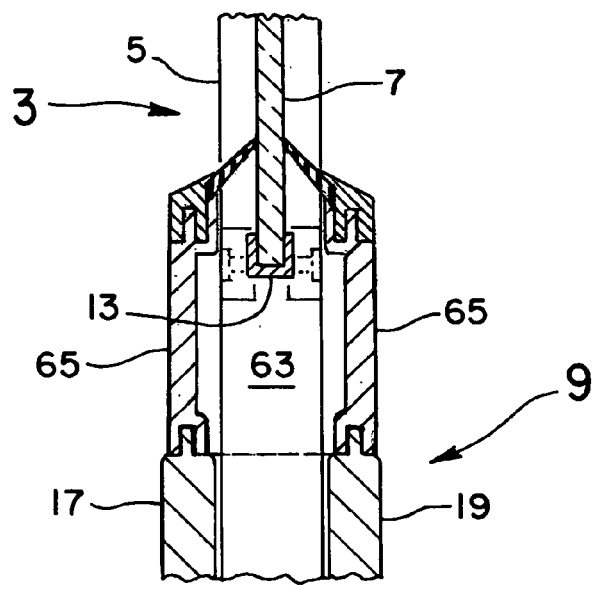
FIG. 23 is a view taken along line 23—23 of FIG. 22.

In FIGS. 22 and 23, a door assembly 1 similar to those of FIGS. 1–14 is shown mounted atop a lower door portion 9 similar to that of FIGS. 20 and 21 which has rising pieces 17' and 19'. In this embodiment, the lower edge 13 of the window section 7 has a rear portion spaced from the lower door portion 9 creating a gap 63 (see FIG. 22). Insert members 65 are then provided that can be slid atop the inner and outer panel sections 17 and 19 of the lower door portion 9 (FIG. 23). These inert members 65 on the inner and outer sides of the window section 7 serve to fill in the gap 63. Like the earlier embodiments, the upper door portion 3 of FIGS. 22 and 23 is removable and can be stored in the lower door portion 9 when not in use.

Figure 24:
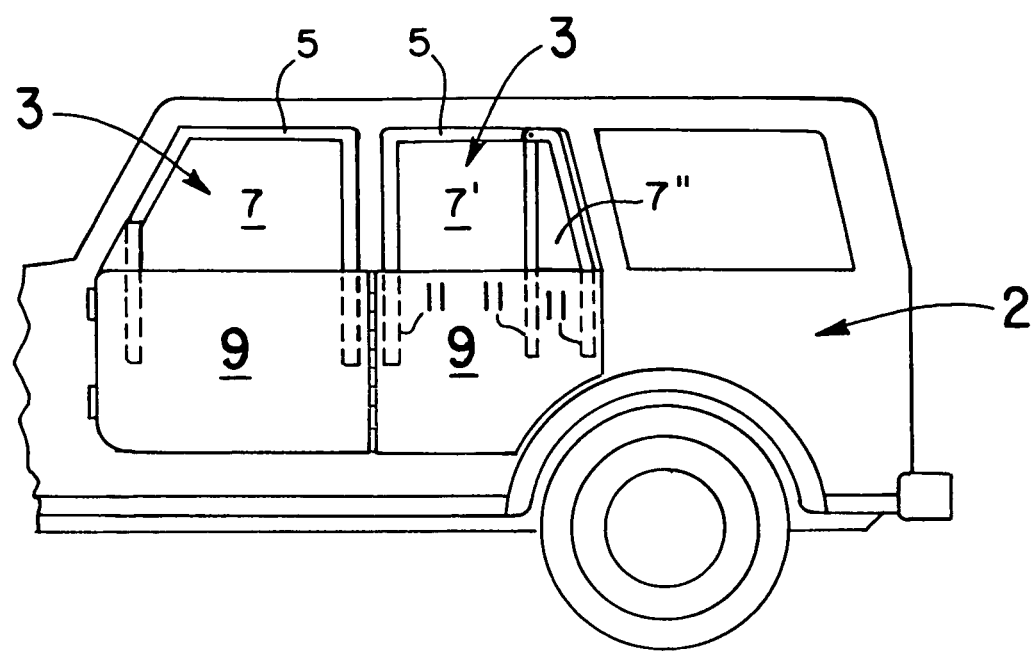
FIG. 24 is an embodiment in which both the front and rear door assemblies have removable upper portions that can be stored within the lower door portions for an open air experience.

Although the invention has been primarily shown in a two door vehicle, the removable and storable, upper door portions 3 are equally adaptable for use with front and rear door assemblies as in FIG. 24. The same is true for back or tailgate assemblies that are made essentially in the fashion of the illustrated embodiments of the present invention. In this regard and as illustrated with the rear door assembly of FIG. 24, the removable upper door portion of the rear door assembly could have two panels 7' and 7" with their frame member 5 being foldable or collapsible in the fashion of the embodiments of FIGS. 15–21. This version could have three leg members 11 as shown or simply have two (e.g., the two outside leg members 11) if desired. Alternatively, the panels 7' and 7" could be part of separate upper door portions from each other. It is also noted that the leg members 11 as disclosed above are preferably mounted for pivotal movement to the folded or collapsed positions for storage but could be removable or collapsible in other manners. Additionally, the frame member 5 could be of flexible or foldable materials but preferably is made of rigid ones (e.g., hard plastics or metal). Similarly, the window section could be made of flexible or foldable materials but preferably is made of rigid ones such as glass or hard plastics.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A door assembly for a vehicle, said door assembly including upper and lower door portions, said lower door portion having at least inner and outer panel sections spaced from each other to create a storage cavity therebetween, said upper door portion having a frame member with a window section mounted therein, said upper door portion being removably mounted to said lower door portion and being selectively positionable between at least first and second positions relative to said lower door portion, said upper door portion in said first position being mounted to said lower door portion with the window section extending upwardly above the lower door portion and said upper door portion in said second position including said frame member and said window section thereof being received in said storage cavity between the panel sections of said lower door portion.

2. The door assembly of claim 1 wherein said upper door portion is mounted to said lower door portion in said first position in a first orientation relative to said lower door portion and said upper door portion is received in said storage cavity of said lower door portion in a second orientation, said second orientation being substantially inverted from said first orientation.

3. The door assembly of claim 2 wherein said second orientation is inverted about a substantially horizontal axis from said first orientation.

4. The door assembly of claim 2 wherein said storage cavity is dimensioned to entirely receive said upper door portion including said frame and window section thereof in said second position.

5. The door assembly of claim 1 wherein said storage cavity is dimensioned to entirely receive said upper door portion including said frame and window section thereof in said second position.

6. The door assembly of claim 1 further including an elongated cover selectively positionable between said panel sections over said storage cavity to cover the upper door portion received in said storage cavity in said second position.

7. The door assembly of claim 6 wherein said cover is an arm rest.

8. The door assembly of claim 1 wherein said upper door portion includes at least one leg member mounted for movement about a pivotal axis relative to said window section between an extend position and a folded position.

9. The door assembly of claim 8 wherein lower door portion has a member dimensioned to slidably receive said leg member in said extended position to support said upper door portion in said first position mounted to said lower door portion with the window section extending upwardly above the lower door portion.

10. The door assembly of claim 1 wherein said upper door portion includes at least one leg member mounted for movement relative to said window section between an extended position and a folded position, said window section having a first edge and said one leg member in said extended position extending away from said first edge and in said folded position extending substantially along said first edge.

11. The door assembly of claim 10 wherein said first edge of said window section extends substantially along a first axis and said one leg member in said extended position extends along an axis substantially perpendicular to said first axis.

12. The door assembly of claim 11 wherein said one leg member in said folded position extends substantially along said first axis.

13. The door assembly of claim 10 wherein said first edge of said window section extends substantially along a first axis and said one leg member in said folded position extends substantially along said first axis.

14. The door assembly of claim 10 wherein said one leg has a substantially U-shape cross section with two sides spaces from each other and a base extending therebetween and said U-shape of said leg member in said folded position is dimensioned to receive at least a portion of the first edge of said window section therein between the two sides of said U-shape.

15. The door assembly of claim 10 wherein said upper door portion further includes a second leg member mounted for movement relative to said window section between an extend position and a folded position, said second leg member in said extended position extending away fro said first edge of said window section and in said folded position extending along said first edge.

16. The door assembly of claim 15 wherein said upper door portion with said leg members in said respective folded position being entirely receivable in said storage cavity of said lower door portion.

17. The door assembly of claim 16 further including an elongated cover selectively positionable over said storage cavity to cover the upper door portion received in said storage cavity.

18. The door assembly of claim 17 wherein said cover is an arm rest.

19. The door assembly of claim 1 wherein said window section includes at least one clear panel retractable from the first position of the window section extending upwardly above the lower door to a retracted position at least substantially received in said storage cavity of said lower door portion.

20. The door assembly of claim 1 wherein the frame member and window section of said upper door portion extend upwardly above the lower door portion in said first position and said window section includes at least one clear panel movable relative to said frame member and retractable from said first position substantially into said storage cavity with said frame member in said first position.

21. The door assembly of claim 20 further including a mechanism to prevent said clear panel from being moved beyond a predetermined, retracted position substantially within the storage cavity of the lower door portion.

22. The door assembly of claim 21 wherein said mechanism includes a handle protruding outwardly of said clear panel and abutting one of said upper and lower door portions with said clear panel in said predetermined, retracted position.

23. The door assembly of claim 20 further including a mechanism to selectively lock said clear panel in said first position extending upwardly above said lower door portion.

24. The door assembly of claim 1 wherein said window section includes at least two clear panels with at least one of said two panels mounted for sliding movement horizontally relative to the other.

25. The door assembly of claim 24 wherein said frame member includes first and second segments mounted to each other for movement about a pivotal axis between an open position with the segments extending substantially away from each other and a folded position with the segments extending substantially along one another.

26. The door assembly of claim 25 wherein said segments are in said open position when said upper door portion is in said first position mounted to said lower door portion with the window section thereof extending upwardly above the lower door portion and said segments are in said folded position when said upper door portion is in said second position receive in said storage cavity of said lower door portion.

27. The door assembly of claim 1 wherein said frame member includes first and second segments mounted to each other for movement about a pivotal axis between an open position with the segments extending substantially away from each other and a folded position with the segments extending substantially along one another.

28. The door assembly of claim 1 wherein said frame member has a portion extending along a first edge of said window section and said upper door portion further includes at least one leg member mounted for movement relative to said portion of the frame member between an extended position extending away from the portion of the frame member and a folded position extending along the portion of the frame member.

29. The door assembly of claim 28 wherein said leg member is mounted for movement about a pivotal axis relative to said frame member between said extended and folded positions.

30. The door assembly of claim 1 wherein at least part of the window section in said first position is spaced from said lower door portion creating a gap therebetween and said door assembly further includes at least one insert member selectively receivable in said gap.

31. The door assembly of claim 30 wherein said window section has inner and outer sides and said one insert member is selectively receivable in said gap adjacent the outer side of said window section and said door assembly further includes a second insert member selectively receivable in said gap adjacent the inner side of said window section.

32. The door assembly of claim 30 wherein said one insert member is selectively mountable to said lower door portion.

* * * * *